Oct. 27, 1970      E. E. SANDLIN      3,536,407
METHOD AND APPARATUS FOR VESICULAR FILM INSPECTION
Filed Sept. 24, 1968
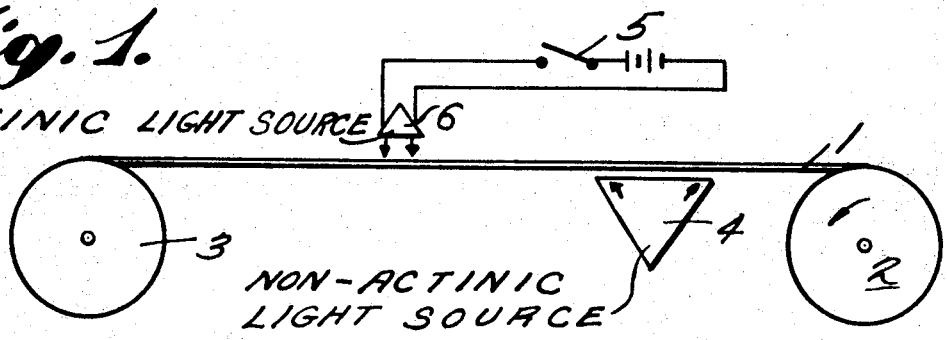
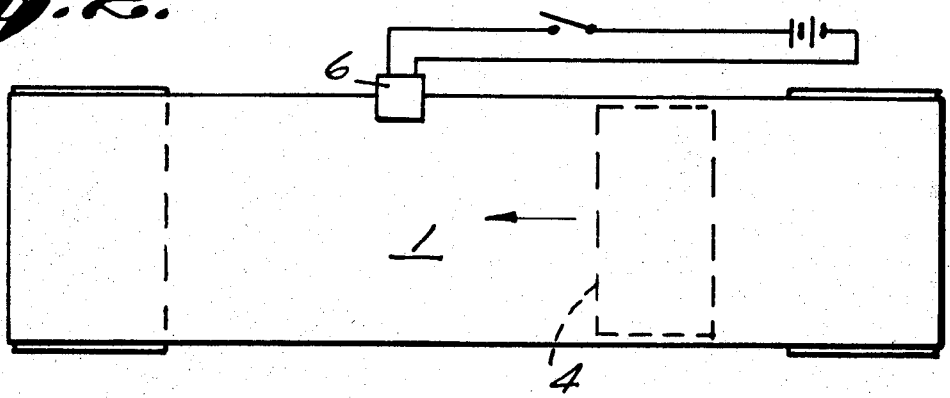
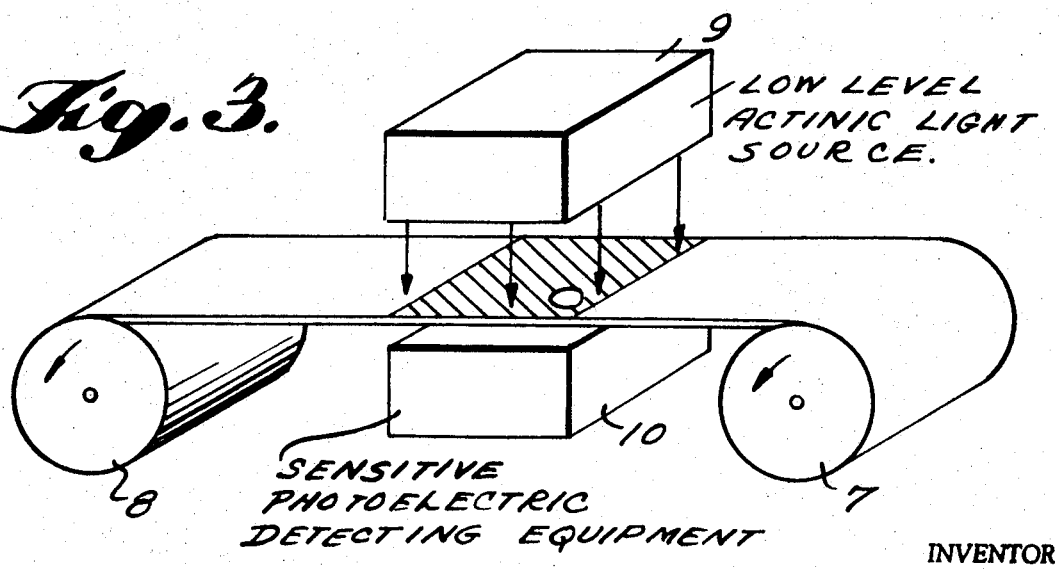
INVENTOR
ERNEST E. SANDLIN
BY Cushman, Darby & Cushman
ATTORNEYS – Patented Oct. 27, 1970

3,536,407
METHOD AND APPARATUS FOR VESICULAR
FILM INSPECTION
Ernest E. Sandlin, CORDS/USAID/RD/SH, Old
Chancery, APO, San Francisco, Calif. 96243
Continuation-in-part of application Ser. No. 384,745,
July 23, 1964. This application Sept. 24, 1968, Ser.
No. 761,964
Int. Cl. G01n 21/16
U.S. Cl. 356—200                                   2 Claims

ABSTRACT OF THE DISCLOSURE

Film inspection method in which defective areas are marked with actinic light. The film is of the vesicular type comprising a plastic or colloid containing dispersed light sensitive agent which is decomposed on exposure to actinic light. Upon such exposure, the light sensitive agent becomes transparent to actinic light, providing a mark. This mark can be "seen" by passing low intensity actinic light through the film.

---

This is a continuation-in-part of prior U.S. patent application Ser. No. 384,745, filed July 23, 1964, now abandoned.

The present invention relates to a method and apparatus for inspecting vesicular photographic film and marking defects in the film. Briefly, the invention comprises using light to mark the defects in the film.

Vesicular photographic film ordinarily comprises a backing layer and a coating on the backing, normally referred to as the emulsion. The latter is a plastic material containing a sensitizer which decomposes when exposed to a selected frequency of light, usually referred to as actinic radiation. In ordinary use, the actinic radiation decomposes the sensitizer in such a way that a gas is released. The film is "developed" by heating which causes the gas to flow together into microscopic bubbles called vesicles, which scatter light and make the exposed areas opaque.

It is customary to inspect photographic film including vesicular photographic film, for visible physical defects and to mark the film for subsequent removal of defective areas. In the past, the film has been exposed to non-actinic light, i.e., light to which the film is not sensitive, and inspected. When the operator has found a defect, he has marked the film with a grease pencil or a felt point pen containing indelible ink.

Certain difficulties have been associated with this system because considerable time is required for even the best inks to dry and because the grease pencil marks may remain tacky. The wet or tacky marks may smear or transfer to other portions of the film when it is rolled. A further disadvantage is the time required for the operator to mark the film.

In accordance with the present invention, the foregoing disadvantages are overcome by "marking" the vesicular film with actinic light, i.e., light to which the film is sensitive. The film is not developed; the "marks" produced by actinic light remain substantially invisible to the naked eye but are seen by means of sensitive photoelectric detecting equipment. This is, by the decomposition of the light sensitive agent, the marked areas of the film lose their capacity to absorb light of the actinic wavelength and are thus rendered transparent to that light. If the film is subsequently passed over low intensity actinic light, this transparency can be detected by a photocell. Preferably, the "mark" is made adjacent the edge of the film to minimize the risk of fogging during subsequent examination under actinic light.

The invention will be more fully understood by reference to the following detailed description of preferred embodiments thereof and to the drawing in which:

FIG. 1 is a schematic elevational view of the apparatus used in marking the film;

FIG. 2 is a plan view of the apparatus of FIG. 1; and

FIG. 3 is a perspective view of the apparatus used to locate "marks."

As shown in FIG. 1, a vesicular photographic film 1 is unwound from a roll 2 and rewound on a roll 3 after it has been advanced in sequence over a source of non-actinic light 4 and under a source of actinic light 6. The actinic light source preferably is mounted over only the edge portion of the film and projects a relatively narrow beam of light onto the film, to permit marking of the film without risking fogging of the central areas thereof. An inspector observes the film as it passes over the non-actinic light source. When he finds a defect, he closes switch 5 which actuates actinic light source 6. The circuit supplying power to the actinic light source may also contain a timing mechanism to assure that the actinic light source will be energized for a predetermined period of time regardless of how long the operator keeps the switch closed so as to assure uniformity of marking.

To view the film, the apparatus of FIG. 3 is used. Film is transferred from reel 7 to reel 8 under low level actinic light source 9 which continuously exposes only the edge portion of the film where the light source 6 may have made a mark. When a marked (transparent) area moves under source 9, light is transmitted to photoelectric detecting equipment 10. If desired, this can stop the movement of the rolls 7 and 8 until the defective area is removed, or, if desired, automatic slitting equipment might be used.

The invention is particularly applicable to vesicular photographic film. Examples of such films include those disclosed in U.S. Pat. 3,032,414 and British Pats. 402,737 and 645,825. Others are disclosed in U.S. patent application of Notley et al., Ser. No. 383,169, filed July 16, 1964, now abandoned, and in the patents and applications mentioned therein. These films comprise a heat softenable plastic material or colloid having dispersed therein a light-sensitive agent which decomposes on exposure to actinic light to form a gaseous product which can coalesce and expand into bubbles or vesicles on heating.

In these films, it is common that the sensitizer is a diazo compound. It is characteristic of that type of sensitizer that, when exposed to actinic light, it is decomposed. One of the results of decomposition is that the sensitizer—originally opaque to actinic light—becomes transparent to that light. Therefore, when the film is "marked" as described above, a "transparent" area is created. That is, since the sensitizer no longer absorbs actinic light in the "marked" area, that area becomes transparent to actinic light. Unmarked areas remain opaque because they still contain undecomposed sensitizer.

The transparency thus described can be "viewed" by shining actinic light on the film. Of course, certain routine precautions are needed to prevent significant exposure of previously unexposed areas, which would render them useless for photography. However, by marking an edge area of the film, the viewing light can be confined to that area. In addition, the intensity of the viewing light is considerably less than necessary to significantly expose the film. For example, if a certain exposure will produce a normal density image in the film, e.g., about 1,000 milliwatt seconds per square centimeter, the viewing light exposure will be considerably less, e.g., by a factor of $10^{-4}$ or more. Fairly high intensity and/or relatively long exposure ordinarily is required for vesicular film, whereas fairly low intensity is adequate for viewing. The only limitation on the degree of reduction in intensity is the sensitivity of the photoelectric detecting equipment. Very sensitive detectors are now possible, using photomultiplier cells and sensitive amplifiers. By reducing the response time of signalling devices used with the detector, the speed of the film past the viewing lamp can be increased, thereby reducing the exposure time and further reducing the likelihood of damage to the sensitive film.

A wide variety of photoelectric detectors are available, any of which are useful in the present invention. Reference may be made to "Procedures in Experimental Physics" by Strong, especially pp. 396–448 for a description of some which may be used.

It will be appreciated that, while the above description has referred to films, the invention may be applied to any type of vesicular photographic elements including sheets, glass plates, printing papers and the like.

The foregoing method is fast, efficient, inexpensive and provides a permanent mark on the area of the film to be rejected. The mark may be of uniform photographic density, size and position; this permits the reject areas to be discarded by automatic equipment which detects the mark by means of photoelectric detectors capable of giving the same electrical signal for each mark.

The invention now having been described with reference to preferred embodiments, it will be understood that various changes may be made in the foregoing method, apparatus and materials without departing from the scope of the invention, as it is defined in the appended claims.

What is claimed is:

1. A process for inspecting and marking defects in heat-developable vesicular photographic film comprising a plastic material or colloid having dispersed therein a light sensitive agent which decomposes on exposure to actinic light and thereafter is transparent to actinic light, said method comprising exposing the film to non-actinic light to which it is insensitive but which permits inspection for defects, inspecting the film and marking areas having defects by exposing at least a portion of said area to actinic light to which the film is sensitive, whereby the said portion is rendered relatively less opaque to said actinic light and thereafter locating said portion by exposing the film to low intensity actinic light without prior development and measuring the absorption thereof by the respective areas of said film.

2. A process for inspecting and marking film as set forth in claim 1 in which said portion which is exposed to actinic light is adjacent the edge of the film.

References Cited

UNITED STATES PATENTS

| | | |
|---|---|---|
| 2,848,107 | 8/1958 | Juengst et al. |
| 2,896,196 | 7/1959 | Hartford et al. |
| 2,993,805 | 7/1961 | Kay. |
| 3,212,399 | 10/1965 | Walter _____ 346—107 X |
| 3,415,433 | 12/1968 | Shaw. |

WILLIAM F. LINDQUIST, Primary Examiner

C. M. LEEDOM, Assistant Examiner

U.S. Cl. X.R.

95—1.1; 96—27; 101—426; 250—219; 346—107